Oct. 8, 1929.  H. P. MILLS  1,730,586
LAMINATED PRODUCT
Filed Sept. 29, 1925
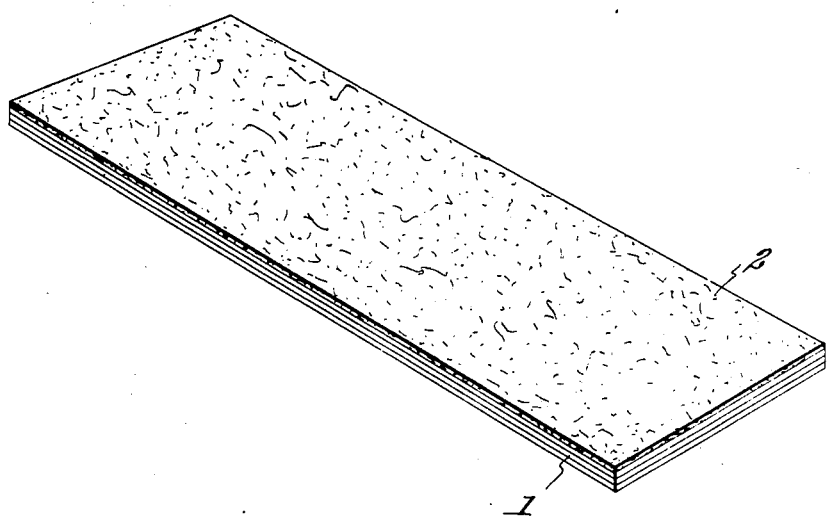
Inventor:
Harry Parker Mills
By Byrnes Townsend Brokenstein
Attorneys.

Patented Oct. 8, 1929

1,730,586

UNITED STATES PATENT OFFICE

HARRY PARKER MILLS, OF TORONTO, ONTARIO, CANADA, ASSIGNOR TO BAKELITE CORPORATION, OF NEW YORK, N. Y., A CORPORATION OF DELAWARE

LAMINATED PRODUCT

Application filed September 29, 1925. Serial No. 59,423.

This invention relates to laminated sheets comprising a fibrous material and a hardened phenolic resin binder. Laminated sheets of this kind are described in United States Patent 1,019,406 to L. H. Baekeland and are made as therein described by coating fibrous sheets, such as paper or fabric, with a reactive phenol resin, superposing the coated sheets to the desired number, and consolidating in a steam heated press, whereby the resin is transformed to its infusible or resinoid state. The resulting sheet or board is hard and strong, resistant to moisture and to temperature changes and has certain highly desirable electrical properties, among which are high insulating value and dielectric strength. With these desirable characteristics however they possess the defect that they are liable to surface charring under high temperatures, as by the action of an electric arc or spark, a circumstance which has limited their application to certain electrical uses, such as starter boxes and the like, for which they are otherwise eminently suited.

This charring is due to separation of carbon both from the cellulosic sheet and from the phenol resin binder. According to the present invention, I overcome the difficulty by forming a composite, laminated sheet of which the outer layer is either wholly free from carbonaceous materials (cellulose and resin) or sufficiently free therefrom so that it will not form conductive paths or areas under the action of the spark or arc. In the preferred embodiment of my invention I accomplish this result by superposing the coated sheets as described in the said patent 1,019,- 406, but providing a surfacing sheet of non-cellulosic material, preferably asbestos. This surfacing sheet may be coated with a non-carbonaceous filler or binding material, as for example sodium silicate, on the exposed or outer face, and may be coated on the inner face with the phenol resin. The whole is then submitted to the hot-pressing operation until the transformation of the resin has taken place, and until the whole assembly, including the facing sheet, has been consolidated into an integral sheet, board, or other article.

In case the cellulosic sheets are sufficiently impregnated or coated with the reactive resin, it is not necessary to apply any resin to the asbestos sheet, which will absorb sufficient resin from the underlying sheet or sheets to anchor it firmly thereto, precaution being taken that the phenolic resin does not penetrate to the exposed surface of the outer sheet in sufficient quantity to lead to the formation of conductive paths as aforesaid. Too great penetration of the outer sheet by the phenolic resin may of course be prevented by partial curing or reaction of the resin prior to the molding operation, and by regulating the amount of resin employed and the thickness of the surfacing layer, in a manner which will be apparent to persons skilled in the art. Coating or impregnation of the asbestos with a non-carbonaceous filler or binder is of course useful in preventing excessive penetration by the resin, but is not essential to the carrying out of the invention.

In the accompanying drawing I have shown a laminated product embodying my invention in a preferred form. The body portion, 1, preferably comprises a plurality of superposed, resin-impregnated sheets. The facing sheet, 2, is united to the body portion by an only partial penetration of the resin binder, and has a substantially noncarbon-containing outer surface. It may comprise a sheet or layer of asbestos or other noncarbon-containing material having its outer surface substantially free from resin binder, or it may comprise such a sheet or layer having its outer surface coated with a suitable non-carbon-containing filler, of which sodium silicate is an example. Such a coating of filler then serves not only to increase the desirable surface qualities of the facing sheet by its own presence, but also by its exclusion of the resin binder, which it tends to prevent from penetrating to the outer surface.

The asbestos may of course be applied in any desired form to constitute the surfacing layer. I have described the use of asbestos paper because of the convenience with which it may be applied in the regular manufacture of laminated sheets; I may however use an asbestos fabric or even loose asbestos fibers.

I claim:

1. A laminated product comprising a body portion of cellulosic material having a hardened phenolic resin binder, and a substantially non-conducting surfacing layer integrally united with said body portion but substantially free from carbon-containing materials.

2. A laminated product comprising a body portion of cellulosic material having a hardened phenolic resin binder, and a substantially non-conducting surfacing layer integrally united to said body portion by partial penetration only of said resin binder, the exposed face of said surfacing layer being substantially free from carbon-containing materials.

3. A laminated product comprising a body portion of cellulosic material having a hardened phenolic resin binder, and a surfacing layer integrally united to said body portion by partial penetration only of said resin binder, the expose face of said surfacing layer being coated with a carbon-free filler.

4. A laminated product comprising a body portion of cellulosic material having a hardened phenolic resin binder, and a surfacing layer integrally united to said body portion by partial penetration only of said resin binder, the exposed face of said surfacing layer being coated with sodium silicate.

5. Method of making a laminated product having a substantially noncarbon-containing exposed surface which comprises coating one surface of a noncarbon-containing sheet with a carbon-free filler, applying the uncoated side of said sheet to a body portion containing a reactive phenolic resin, and subjecting the whole to heat and pressure, whereby said resin only partially penetrates said sheet from the inner side and produces an integral union by hardening.

In testimony whereof, I affix my signature.

HARRY PARKER MILLS.